United States Patent [19]

Noda et al.

[11] Patent Number: 4,981,901

[45] Date of Patent: Jan. 1, 1991

[54] WATER-BORNE COATING COMPOSITION

[75] Inventors: Hideyoshi Noda, Nishinomiya; Teruaki Kuwajima, Higashiosaka; Motoyoshi Yoshikawa, Yamatotakada, all of Japan

[73] Assignee: Nippon Paint Co., Ltd., Osaku, Japan

[21] Appl. No.: 350,037

[22] Filed: May 10, 1989

[30] Foreign Application Priority Data

May 12, 1988 [JP] Japan .............................. 63-117774

[51] Int. Cl.$^5$ .............................................. C08L 51/00
[52] U.S. Cl. ...................................... 524/504; 524/502
[58] Field of Search ......................................... 524/504

[56] References Cited

U.S. PATENT DOCUMENTS 4,329,266 5/1982 Suzuki et al. ...................... 524/504
4,731,409 3/1988 Miwa et al. ........................ 524/504

Primary Examiner—Joseph L. Schofer
Assistant Examiner—R. H. Delmendo
Attorney, Agent, or Firm—Wenderoth, Lind & Ponack

[57] ABSTRACT

A water-borne coating composition, having excellent storage stability and coating appearance, containing a specific graft polymer.

11 Claims, No Drawings

WATER-BORNE COATING COMPOSITION

FIELD OF THE INVENTION

The present invention relates to a water-borne coating composition which has excellent storage stability and coating appearance.

BACKGROUND OF THE INVENTION

Water-borne coating compositions are intensively studied in this field, because they are very useful in view of avoiding fire risk and avoiding use of an organic solvent which is expensive and harmful.

Japanese Patent Publication (examined) No. 58101/1986 discloses a water dispersed coating composition which contains an acrylic graft copolymer. The acrylic graft copolymer has an acid value of 15 to 40 and a glass transition temperature of −10° to 70° C. It also has carboxyl groups, hydroxyl groups and optionally amide groups. The composition, however, is still poor in coating workability and circulation stability.

SUMMARY OF THE INVENTION

The present invention provides a coating composition which has excellent coating workability and circulation stability. The coating composition comprises an aqueous dispersion composed of an aqueous resin and an aqueous medium and a graft polymer dispersed therein, wherein said graft polymer has a branch chain with a molecular weight of 1,000 to 4,000 and a principal chain, and has a total molecular weight of 5,000 to 100,000, either the branch chain or the principal chain is hydrophobic and has a solubility parameter of 8.0 to 11.5, the other is hydrophilic and has a solubility parameter of 10.0 to 13.0 and the absolute value of the difference between both solubility parameters is at least 1, and, when the graft polymer is mixed in the an aqueous medium to form an aqueous solution which has a concentration of 10 to 70% by weight and a viscosity of 50 to 10,000 cps, the resultant mixture has an integrating sphere turbidity of not more than 50 degree (kaoline), and the absolute value of the difference between the solubility parameter of said aqueous resin and that of the hydrophilic portion of said graft polymer is not more than 2.

The present invention also provides a water-borne coating composition comprising an aqueous dispersion composed of a graft polymer and an aqueous medium, and a water insoluble resin (1) dispersed therein, wherein said graft polymer has a branch chain with a molecular weight of 1,000 to 4,000 and a principal chain, and has a total molecular weight of 5,000 to 100,000, either the branch chain or the principal chain is hydrophobic and has a solubility parameter of 8.0 to 11.5, the other is hydrophilic and has a solubility parameter of 10.0 to 13.0 and the absolute value of the difference between both solubility parameters is at least 1, and, when the graft polymer is mixed in an aqueous medium to form an aqueous solution which has a concentration of 10 to 70% by weight and a viscosity of 50 to 10,000 cps, the resultant mixture has an integrating sphere turbidity of not more than 50 degree (kaoline), the absolute value of the difference between the solubility parameter of said water insoluble resin (1) and that of the hydrophobic portion of said graft polymer is not more than 2 and said water insoluble resin (1) has an acid value of not more than 15.

The present invention further provides a water-borne coating composition comprising an aqueous dispersion composed of a graft polymer and an aqueous medium, and a water insoluble resin (2) dispersed therein, wherein said graft polymer has a branch chain with a molecular weight of 1,000 to 4,000 and a principal chain, and has a total molecular weight of 5,000 to 100,000, either the branch chain or the principal chain is hydrophobic and has a solubility parameter of 8.0 to 11.5, the other is hydrophilic and has a solubility parameter of 10.0 to 13.0 and the absolute value the difference between both solubility parameters is at least 1, and, when the graft polymer is mixed in aqueous medium to form an aqueous solution which has a concentration of 10 to 70% by weight and a viscosity of 50 to 10,000 cps, the resultant mixture has an integrating sphere turbidity of not more than 50 degree (kaoline), the absolute value of the difference between the solubility parameter of said water insoluble resin (2) and that of the hydrophilic portion of said graft polymer is not more than 2, and said water insoluble resin (2) has an acid value of 15 to 100.

DETAILED DESCRIPTION OF THE INVENTION

The graft polymer of the present invention has a hydrophilic portion and a hydrophobic portion. Generally, the hydrophobic portion has a relatively low solubility parameter (SP) value and the hydrophilic portion has a relatively high SP value. It is required that the absolute value of the difference between both solubility parameter (SP) values be at least 1.0. The difference of the solubility parameter (SP) values enhances water dispersibility of the graft polymer. In the present invention, the hydrophobic portion has a solubility parameter (SP) of 8.0 to 11.5 and the hydrophilic portion has a solubility parameter (SP) of 10.0 to 13.0. The hydrophobic or hydrophilic portion may be either a principal chain or a graft chain. In other words, if the principal chain is hydrophilic, the graft chain shall be hydrophobic, and if the principal chain is hydrophobic, then the graft chain shall be hydrophilic.

The graft polymer can be prepared by methods known to the art. For example, it may be prepared by adding an unsaturated glycidyl monomer to an acryl polymer having an acid group to form an acryl polymer having an unsaturated double bond, which is then polymerized with other polymerizable monomers. The acid group of the acryl polymer may be introduced by using acrylic acid or methacrylic acid as a monomer. Also, the introduction of acid group may be carried out by a method wherein a polymerization reaction is conducted in the presence of a chain transfer agent, such as thioglycol, etc. or by a method wherein a polymerization reaction is conducted using a polymerization initiator having a terminal acid group. Typical examples of the monomers which are used both for the preparation of the acryl polymer and for grafting, provided that the term "(meth)acryl" herein includes both acryl and methacryl, are (meth)acryl esters, such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate, methoxybutyl (meth)acrylate, methoxyethyl (meth)acrylate, ethoxybutyl (meth)acrylate, allyl (meth)acrylate, hydroxyethyl (meth)acrylate, hydroxypropyl (meth)acrylate, diethylaminoethyl (meth)acrylate, methylaminoethyl (meth)acrylate and allyloxyethyl (meth)acrylate; (meth)acrylamide, such as N-methylol (meth)acrylamide and N-alkoxymethylol (meth)acrylamide (e.g. N-isobutoxymethylol (meth)acrylamide etc.); vinyl aromatic compounds, such as styrene, alpha-methylstyrene, vinyltoluene, gamma-chlorostyrene and vinylpyridine; polyolefin compounds, such as butadiene, isoprene and chloroprene; others, such as acrylonitrile, methacrylonitrile, methyl isopropenyl ketone; and the like. Typical examples of the unsaturated glycidyl monomers are glycidyl (meth)acrylate and the like. According to the selection of the monomers, each portion of the graft polymer is made hydrophobic or hydrophilic.

The graft polymer has a number average molecular weight of 5,000 to 100,000, preferably 5,000 to 50,000, in which the graft chain has a number average molecular weight of 1,000 to 4,000. The molecular weight is determined by gel permeation chromatography (GPC).

The solubility parameter (SP) is determined with the following formula of K. SUH, J. M. CORBETT; Journal of Applied Polymer Science, 12, 2359('68):

$$SP = (\sqrt{Vml} \cdot \delta ml + \sqrt{Vmh} \cdot \delta mh)/(\sqrt{Vml} + \sqrt{Vmh})$$

wherein ml shows a low SP solvent, mh shows a high SP solvent, $\delta$ shows a solubility parameter and V shows a molecular volume at turbidimetric point.

The graft polymer, if necesary, may be changed to a water dispersible one by neutralizing acid groups in the polymer with basic materials. Typical examples of the basic materials are monomethylamine, dimethylamine, trimethylamine, monoethylamine, triethylamine, monoisopropylamine, diisopropylamine, diethylenetriamine, triethylenetetramine, monoethanolamine, diethanolamine, triethanolamine, monoisopropanolamine, diisopropanolamine, dimethylethanolamine, morpholine, piperidine, ammonia, sodium hydroxide, potassium hydroxide, lithium hydroxide and the like.

According to the present invention, when the graft polymer is dispersed in an aqueous medium to form a water dispersion having a concentration of 10 to 70% by weight and a viscosity of 50 to 10,000 cps, the dispersion has an integrating sphere turbidity of not more than 50 degree (kaoline). The integrating sphere turbidity is determined according to JIS K 0101-1979 and expressed as "degree (kaoline)". That is, the integrating sphere turbidity is determined from a calibration curve which has been calibrated using a kaolin standard solution, and the ratio of the intensity of light scattered by particles in water and the intensity of transmitted light.

The graft polymer mentioned above is combined with an aqueous resin or a water-insoluble resin to form a water-borne coating composition of the present invention. The term "aqueous resin" herein means water soluble or water dispersible. The aqueous resin is selected such that the absolute value of the difference between the solubility parameter of the aqueous resin and that of the hydrophilic portion of the graft polymer is not more than 2.0. If the difference is more 2.0, cured coatings become dull and brightness and transparency of the coatings decline. It is preferred that the aqueous resin has a surface tension of not more than 51 dyne/cm when it is mixed in water to form a 1 wt % aqueous solution. It is also preferred that the aqueous resin has a water-tolerance of at least 4, provided that the water-tolerance is expressed by a water dilution ratio determined by adding deionized water to a 100 ml beaker containing a water-borne varnish of the aqueous resin having a solid content of 5 g until one can not read a No. 1 type print through the beaker. Water-tolerances of less than 4 increase the viscosity of the composition and lower dispersion stability. Surface tensions of more than 51 dyne/cm are not preferred because of increased viscosity and poor dispersion stability. The aqueous resin can be any one which meets the above mentioned physical properties, for example, an alkyd resin, a polyester resin, an acryl resin, a urethane resin, an aminoplast resin, a maleic resin and the like.

In the first embodiment of the present invention, the aqueous resin is dispersed in an aqueous medium and then the graft polymer is dispersed therein.

The aqueous medium is primarily water, but other solvents, such as polyhydric alcohols or a derivative thereof, and amine compounds may be contained in a small amount. The aqueous resin is water-solubilized by art-known methods, if necessary, and then mixed with the aqueous medium. The graft polymer is dispersed therein to form a water-borne coating composition of the present invention. Mixing can be generally carried out at 35° to 95° C. in a mixer. A weight ratio of the aqueous resin to the graft polymer is preferred within the range of 98/2 to 30/70. If the weight ratio is more than 30/70, dispersion stability becomes poor to result in precipitation of the contents and poor appearance of the cured film, especially poor transparency.

In the second and third embodiments of the present invention, the graft polymer is dispersed in an aqueous medium and then a water-insoluble resin is dispersed therein. In these embodiments, the water-insoluble resin is different from each other. The second embodiment uses a resin (1) whose solubility parameter is different from that of the hydrophobic portion of the graft polymer by not more than 2 in absolute value, and which has an acid value of not more than 15. The third embodiment uses a resin (2) whose solubility parameter is different from that of the hydrophilic portion of the graft polymer by not more than 2 in absolute value, and which has an acid value of 15 to 100.

The water-insoluble resin (1) has a function of reducing the hot melt viscosity of the graft polymer. Preferably, it has a number average molecular weight of 3,000 to 10,000. If the absolute value of the difference of the solubility parameters is more than 2, the obtained coating composition becomes turbid to reduce brightness and transparency. If it has an acid value of more than 15, dispersion stability and circulation stability are poor. An amount of the water-insoluble resin (1) is 5 to 100 parts by weight, preferably 5 to 50 parts by weight based on 100 parts by weight of the graft polymer. Amounts of more than 100 parts by weight reduce dispersion stability to result in precipitation problems or poor appearance of a cured film, especially poor transparency. The resin (1) can be formulated into the water-borne dispersion by a mixer.

In the water-insoluble resin (2), if the absolute value of the difference of the solubility parameters is more 2.0, the cured film is dull to result in poor brightness and transparency. Acid values outside the range reduce dispersion stability and circulation stability. An amount of the resin (2) is 2 to 150 parts by weight based on 100 parts by weight of the graft polymer. Amounts of more than 150 parts by weight reduce dispersion stability to result in precipitation problems or poor appearance of a cured film, especially poor transparency.

The three types of water-borne coating compositions of the present invention may further contain an amino resin to form a thermosetting water-borne coating composition. Examples of the amino resins are an alkoxylized melamine-formaldehyde resin, i.e. an alkoxylized condensate of melamine with formaldehyde or paraformaldehyde, such as methoxylated methylolmelamine, isobutoxylated methylolmelamine, n-butoxylated methylolmelamine; and the like.

The water-borne coating composition may further contain other solvents, color pigments, dyes, extenders and the like, if necessary. Metal powder may also be formulated therein. Other additive, such as defoaming agents, leveling agents, UV absorbers and antioxidants may further be added in the coating composition.

The water-borne coating composition of the present invention has excellent circulation stability and coating workability. It is very preferred for electrocoating.

EXAMPLES

The present invention is illustrated by the following examples which are not construed as limiting the present invention to their details.

Production Example 1

Preparation of a graft polymer (i)

A one liter reaction vessel equipped with a stirrer, a temperature controlling device and a condenser was charged with 400 parts by weight of xylene and heated to 120° C. with stirring. A mixture of 73.6 parts by weight of styrene, 151.6 parts by weight of methyl methacrylate, 100.8 parts by weight of ethylhexyl acrylate, 74.4 parts by weight of 2-hydroxyethyl methacrylate, 40 parts by weight of an initiator (Kaya Ester O available from Kayaku Nuly Company) and 17.2 parts by weight of methacrylic acid was added dropwise for 3 hours and mixing was continued for another 2 hours. Next, 0.1 part by weight of hydroquinone and 17.0 parts by weight of glycidyl methacrylate were added to the obtained resin solution and mixed at 140° C. for 3 hours to obtain a hydrophobic oligomer having an acid value of 3.0, a number average molecular weight of 2,500, and SP value of 10.3 and a nonvolatile content of 50%.

The same type of reaction vessel as used above was charged with 45 parts by weight of butyl diglycol and heated to 120° C. with stirring. To the reaction vessel, a mixture of 400 parts by weight of the above hydrophobic oligomer, 52.6 parts by weight of styrene, 63.8 parts by weight of methyl methacrylate, 35.0 parts by weight of ethylhexyl acrylate, 30.2 parts by weight of hydroxyethyl acrylate, 18.4 parts by weight of methacrylic acid and 14 parts by weight of Kaya Ester O was added dropwise for 3 hours to polymerize it, and mixing was continued. Xylene was removed by distillation under a reduced pressure to obtain a graft polymer solution having a nonvolatile content 87%. The graft polymer had a number average molecular weight of 8,000, an acid value of 30, a hydroxyl value of 74, a ratio of hydrophobic portion/hydrophilic portion of 50/50 and a hydrophilic portion SP value of 11.4. The graft polymer was neutralized 100% with dimethylethanolamine and diluted with water up to a nonvolatile content of 20%. The obtained aqueous solution has a viscosity of 500 cps and a turbidity of 3 degree (kaoline).

Production Example 2

Preparation of a graft polymer (ii)

The same type of reaction vessel as in Production Example 1 was charged with 400 parts by weight of xylene and heated to 120° C. with stirring. A mixture of 121.6 parts by weight of ethylhexyl methacrylate, 110.0 parts by weight of lauryl methacrylate, 94.0 parts by weight of t-butyl methacrylate, 74.4 parts by weight of 2-hydroxyethyl methacrylate, 40 parts by weight of Kaya Ester O and 17.2 parts by weight of methacrylic acid was added dropwise for 3 hours and mixing was continued for another 2 hours. Next, 0.1 part by weight of hydroquinone and 17.0 parts by weight of glycidyl methacrylate were added to the obtained resin solution and mixed at 140° C. for 3 hours to obtain a hydrophobic oligomer having an acid value of 2.5, a number average molecular weight of 2,600, an SP value of 9.5 and a nonvolatile content of 50%.

The same type of reaction vessel as used above was charged with 45 parts by weight of butyl diglycol and heated to 120° C. with stirring. To the reaction vessel, a mixture of 400 parts by weight of the hydrophobic oligomer, 52.6 parts by weight of styrene, 63.8 parts by weight of methyl methacrylate, 35.0 parts by weight of ethylhexyl acrylate, 30.2 parts by weight of hydroxyethyl acrylate, 18.4 parts by weight of methacrylic acid and 14 parts by weight of Kaya Ester O was added dropwise for 3 hours to polymerize it, and mixing was continued. Xylene was removed by distillation under a reduced pressure to obtain a graft polymer solution having a nonvolatile content 86%. The graft polymer had a number average molecular weight of 8,000, an acid value of 30, a hydroxyl value of 74, a ratio of hydrophobic portion/hydrophilic potion of 50/50 and a hydrophilic portion SP value of 11.4. The graft polymer was neutralized 100% with dimethylethanolamine and diluted with water up to a nonvolatile content of 20%. The obtained aqueous solution has a viscosity of 300 cps and a turbidity of 8 degree (kaoline).

Production Example 3

Preparation of an aqueous resin

The same type of reaction vessel as in Production Example 1 was charged with 35 parts by weight of dibutyl diglycol and heated to 120° C. with stirring. A mixture of 10 parts by weight of styrene, 40.6 parts by weight of methyl methacrylate, 21.63 parts by weight of ethylhexyl acrylate, 18.56 parts by weight of 2-hydroxyethyl methacrylate, 2.5 parts by weight of Kaya Ester O and 9.21 parts by weight of methacrylic acid was added dropwise for 3 hours to obtain an acryl resin having an acid value of 60, an SP value of 11.5, a hydroxyl value of 80 and a molecular weight of 10,000.

A water-borne varnish was prepared by mixing 135 parts by weight of the above obtained resin varnish and 9.0 parts by weight of dimethylethanolamine followed by the addition of 142 parts by weight of deionized water at 50° C.

Example 1

A vessel was charged with 285 parts by weight of the aqueous varnish of Production Example 3 and heated to 60° C. A mixture of 92 parts by weight of the graft polymer (i), 72 parts by weight of a melamine resin (Cymel 303 available from Mitsui Toatsyu Chemicals Inc.) and 20 parts by weight of ehtyleneglycol monobutyl ether was slowly added with stirring and mixing was continued at 60° C. for one hour to obtain a water-borne dispersion having a particle size of 0.1 micron.

The obtained dispersion was diluted with deionized water to adjust to a No. 4 Ford Cup viscosity of at least 30 seconds. The paint was spray-coated on a steel panel at 25° C. and a relative humidity of 80% and allowed to stand for 5 minutes. The panel was baked at 150° C. for 15 minutes. Workability of the paint and brightness of the coating were evaluated and the results are shown in Table 1.

Example 2

A vessel was charged with 285 parts by weight of the aqueous varnish of Production Example 3 and heated to 60° C. A mixture of 92 parts by weight of the graft polymer (ii), 72 parts by weight of Cymel 303 and 20 parts by weight of ethyleneglycol monobutyl ether was slowly added with stirring and mixing was continued at 60° C. for one hour to obtain a water-borne dispersion having a particle size of 0.1 micron.

The same evaluation was carried out as generally described in Example 1 and the results are shown in Table 1.

Example 3

Preparation of a pigment paste

The aqueous resin of Production Example 3 was diluted with water to form a water-borne resin solution having a nonvolatile content of 20%. Forty parts by weight of the water-borne resin solution and a white pigment (Taipake R-930 available from Ishihara Sangyo Company) were preliminarily mixed and further ground using glass beads at room temperature for 40 minutes in a paint conditioner to obtain a pigment paste.

The pigment paste was mixed with the water borne dispersion of Example 1 in a weight ratio of 94/80 (dispersion/paste) to obtain a white paint.

The same evaluation was carried out as generally described in Example 1 and the results are shown in Table 1.

Example 4

The pigment paste of Example 3 was mixed with the water borne dispersion of Example 2 in a weight ratio of 90/80 (dispersion/paste) to obtain a white paint.

The same evaluation was carried out as generally described in Example 1 and the results are shown in Table 1.

Comparative Example 1

An acryl resin solution (solid content=80%) containing an acryl resin having an acid value of 60, a hydroxyl value of 50 and a number average molecular weight of 3,900 in ethyleneglycol monoethyl ether was neutralized 100% with dimethylethanolamine and diluted with water to a nonvolatile content of 35%, to which another acryl resin solution (solid content=80%) containing an acryl resin (SP value=9.35, OH value=40, number average molecular weight=4,000) in Solve Esso 150 (Esso Petroleum Company) was dispersed in a solid ratio of 1/1 to form a water borne dispersion.

Cymel 303 was mixed with the obtained water borne dispersion in a solid ratio of 3/7 (Cymel/dispersion) to form a clear varnish.

Separately, 40 parts by weight of a white pigment (Taipake R-930 available from Ishihara Sangyo Company) was mixed with 40 parts by weight of the water borne dispersion mentioned above, and further ground using glass beads in a paint conditioner to obtain a pigment paste. Then, 80 parts by weight of the pigment paste was mixed with 87 parts by weight of the above clear varnish to obtain a white pigment.

The same evaluation was carried out as generally described in Example 1 and the results are shown in Table 1.

TABLE 1

| Examples | Graft polymer Hydrophobic portion SP | Graft polymer Hydrophilic portion SP | Aqueous resin SP | Absolute value SP difference [1] | Brightness of coating 60°/20° | Workability Pin hole limit (micron) | Workability Sag limit (micron) | Coating brightness after circulation [2] 60°/20° |
|---|---|---|---|---|---|---|---|---|
| 1 | 10.3 | 11.4 | 11.5 | 0.1 | 98/86 | 56 | 60 | 98/86 |
| 2 | 9.5 | 11.4 | 11.5 | 0.1 | 96/85 | 54 | 70 | 96/85 |
| 3 | 10.3 | 11.4 | 11.5 | 0.1 | 94/84 | 54 | 67 | 94/84 |
| 4 | 9.5 | 11.4 | 11.5 | 0.1 | 93/84 | 55 | 70 | 93/84 |
| Comparative Ex. 1 | 9.35 | | 11.0 | — | 91/83 | 40 | 35 | 88/78 |

[1] Between the hydrophilic portion and the aqueous resin.
[2] After circulating one week by a gear pump.

Production Example 4

The same type of reaction vessel as in Production Example 1 was charged with 400 parts by weight of xylene and heated to 120° C. with stirring. A mixture of 20 parts by weight of styrene, 35.2 parts by weight of methyl methacrylate, 25.0 parts by weight of ethylhexyl acrylate, 18.6 parts by weight of 2-hydroxyethyl methacrylate, 5 parts by weight of Kaya Ester O and 1.23 parts by weight of methacrylic acid was added dropwise for 3 hours to obtain an acryl resin having an acid value of 8.0, an SP value of 10.4, a hydroxy value of 80 and a number average molecular weight of 4,000.

Production Example 5

The same type of reaction vessel as in Production Example 1 was charged with 400 parts by weight of xylene and heated to 120° C. with stirring. A mixture of 20 parts by weight of styrene, 2.6 parts by weight of lauryl methacrylate, 58.1 parts by weight of ethylhexyl acrylate, 18.6 parts by weight of 2-hydroxyethyl methacrylate, 10 parts by weight of Kaya Ester O and 0.8 parts by weight of methacrylic acid was added dropwise for 3 hours to obtain an acryl resin having an acid value of 5.0, an SP value of 9.5, a hydroxy value of 80 and a number average molecular weight of 2,500.

Example 5

A reaction vessel was charged with 115 parts by weight of the graft polymer (i) and 4 parts by weight of dimethylethanolamine and diluted with 167 parts by weight of deionized water to obtain a water borne varnish having a nonvolatile content of 35%.

To the water borne varnish, a mixture of 30 parts by weight of the water insoluble polymer and 56 parts by weight of Cymel 303 was dispersed. Dispersing was carried out by slowly adding the mixture to the water borne varnish with stirring by a labo mixer for one hour. The dispersion is stable and has a particle size of 0.1 micron.

The same evaluation was carried out as generally described in Example 1 and the results are shown in Table 2.

TABLE 2

| Examples | Graft polymer | | Water insoluble polymer SP | Absolute value SP difference [1] | Brightness of coating 60°/20° | Workability | | Coating brightness after circulation 60°/20° |
| | Hydrophobic portion SP | Hydrophilic portion SP | | | | Pin hole limit (micron) | Sag limit (micron) | |
| --- | --- | --- | --- | --- | --- | --- | --- | --- |
| 5 | 10.3 | 11.4 | 10.4 | 0.1 | 98/87 | 56 | 60 | 98/87 |
| 6 | 9.5 | 11.4 | 9.5 | 0 | 97/86 | 50 | 70 | 97/86 |
| 7 | 10.3 | 11.4 | 11.5 | 0.1 | 93/84 | 55 | 65 | 93/84 |
| 8 | 9.5 | 11.4 | 9.5 | 0 | 92/84 | 52 | 70 | 92/84 |
| Comparative Ex. 2 | 10.3 | 11.4 | — | — | 98/84 | 30 | 40 | 98/84 |

[1] Between the hydrophilic portion and the water insoluble polymer.

The same evaluation was carried out as generally described in Example 1 and the results are shown in Table 2.

Example 6

A vessel was charged with 115 parts by weight of the graft polymer (ii) and 4 parts by weight of dimethylethanolamine and diluted with 167 parts by weight of deionized water to obtain a water borne varnish having a nonvolatile content of 35%. A mixture of 30 parts by weight of the water insoluble polymer of Production Example 5 and 56 parts by weight of Cymel 303 was dispersed into the water borne varnish. Dispersing was carried out as generally described in Example 5. The water borne dispersion had a particle size of 0.1 micron.

The same evaluation was carried out as generally described in Example 1 and the results are shown in Table 2.

Example 7

The graft polymer (i) of Production Example 1 was diluted with water to form a water-borne resin solution having a nonvolatile content of 20%. Forty parts by weight of the water-borne resin solution and 40 parts by weight of a white pigment (Taipake R-930 available from Ishihara Sangyo Company) were preliminarily mixed and further ground using glass beads at room temperature for 40 minutes in a paint conditioner to obtain a pigment paste.

The pigment paste was mixed with the water borne dispersion of Example 5 in a weight ratio of 40/50 (dispersion/paste) to obtain a white paint.

The same evaluation was carried out as generally described in Example 1 and the results are shown in Table 2.

Example 8

A white paint was prepared as generally described in Example 7, with the exception that the graft polymer (i) of Production Example 1 was changed to the graft polyer (ii) of Production Example 2 and the water borne dispersion of Example 5 is changed to that of Example 6.

The same evaluation was carried out as generally described in Example 1 and the results are shown in Table 2.

Comparative Example 2

The graft polymer of Production Example 1 was neutralized with dimethylethanolamine and diluted with water, to which Cymel 303 was added in a solid ratio of 70/30 to form a clear paint.

Production Example 6

The same type of reaction vessel as in Production Example 1 was charged with 35 parts by weight of butyl diglycol and heated to 120° C. with stirring. A mixture of 20 parts by weight of styrene, 25.7 parts by weight of methyl methacrylate, 28.1 parts by weight of ethylhexyl acrylate, 18.5 parts by weight of 2-hydroxyethyl methacrylate, 7 parts by weight of Kaya Ester O and 7.67 parts by weight of methacrylic acid was added dropwise for 3 hours to obtain an acryl resin (nonvolatile content=73%) having an acid value of 50, an SP value of 11.0, a hydroxy value of 80 and a number average molecular weight of 4,000.

Production Example 7

The same type of reaction vessel as in Production Example 1 was charged with 35 parts by weight of butyl diglycol and heated to 120° C. with stirring. A mixture of 10 parts by weight of styrene, 40.6 parts by weight of methyl methacrylate, 21.63 parts by weight of ethylhexyl acrylate, 18.56 parts by weight of 2-hydroxyethyl methacrylate, 7 parts by weight of Kaya Ester O and 9.21 parts by weight of methacrylic acid was added dropwise in a short time to obtain an acryl resin (nonvolatile content=73) having an acid value of 60, an SP value of 11.5, a hydroxy value of 80 and a number average molecular weight of 4,000.

Example 9

A reaction vessel was charged with 115 parts by weight of the graft polymer (i) and 4 parts by weight of dimethylethanolamine and diluted with 167 parts by weight of deionized water to obtain a water borne varnish having a nonvolatile content of 35%.

To the water borne varnish, a mixture of 41 parts by weight of the water insoluble polymer of Production Example 6 and 40 parts by weight of Cymel 303 was dispersed. Dispersing was carried out at 60° C. by slowly adding the mixture to the water borne varnish with stirring by a labo mixer for one hour. The dispersion is stable and has a particle size of 0.1 micron.

The same evaluation was carried out as generally described in Example 1 and the results are shown in Table 3.

Example 10

A vessel was charged with 115 parts by weight of the water insoluble graft polymer (ii) and 4 parts by weight of dimethylethanolamine and diluted with 167 parts by weight of deionized water to obtain a water borne varnish having a nonvolatile content of 35%. A mixture of 41 parts by weight of the water insoluble polymer of Production Example 7 and 40 parts by weight of Cymel 303 was dispersed into the water borne varnish. Dispersing was carried out as generally described in Example 9. The water borne dispersion had a particle size of 0.1 micron.

The same evaluation was carried out as generally described in Example 1 and the results are shown in Table 3.

Example 11

The graft polymer (i) of Production Example 1 was diluted with water to form a water-borne resin solution having a nonvolatile content of 20%. Forty parts by weight of the water-borne resin solution and 40 parts by weight of a white pigment (Taipake R-930 available from Ishihara Sangyo Company) were preliminarily mixed and further ground using glass beads at room temperature for 40 minutes in a paint conditioner to obtain a pigment paste.

The pigment paste was mixed with the water borne dispersion of Example 9 in a weight ratio of 50/40 (dispersion/paste) to obtain a white paint.

The same evaluation was carried out as generally described in Example 1 and the results are shown in Table 3.

Example 12

A white paint was prepared as generally described in Example 11, with the exception that the graft polymer (i) of Production Example 1 was changed to the graft polymer (ii) of Production Example 2 and the water borne dispersion of Example 9 is changed to that of Example 10.

The same evaluation was carried out as generally described in Example 1 and the results are shown in Table 3.

sphere turbidity of not more than 50 degree (kaoline), and the absolute difference between the solubility parameter of said aqueous resin and that of the hydrophilic portion of said graft polymer is not more than 2.

2. The water-borne coating composition according to claim 1 wherein the aqueous resin has a surface tension of not more than 51 dyne/cm when it is mixed with water to form a 1 wt % aqueous solution.

3. The water-borne coating composition according to claim 2 wherein the aqueous resin has a water-tolerance of at least 4, provided that the water-tolerance is expressed by a water dilution ratio determined by adding deionized water into a 100 ml beaker containing a water-borne varnish of the aqueous resin having a solid content of 5 g until one can not read a No. 1 type print through the beaker.

4. The water-borne coating composition according to claim 1 having a weight ratio of the aqueous resin to the graft polymer within the range of 98/2 to 30/70.

5. A water-borne coating composition comprising an aqueous dispersion composed of a graft polymer and an aqueous medium, and a water-insoluble resin (1) dispersed therein, wherein said graft polymer has a branch chain with a number average molecular weight of 1,000 to 4,000 and a principal chain, and has a total number average molecular weight of 5,000 to 100,000, one of the branch chain and the principal chain is hydrophobic and has a solubility parameter of 8.0 to 11.5, and the other of the branch chain and the principal chain is hydrophilic and has a solubility parameter of 10.0 to 13.0, and the solubility parameters have an absolute difference therebetween of at least 1, and, when the graft polymer is mixed in an aqueous medium to form an aqueous solution which has a concentration of 10 to 70% by weight and a viscosity of 50 to 10,000 cps, the resultant mixture has an integrating sphere turbidity of not more than 50 degree (kaoline), the absolute differ-

TABLE 3

| | Graft polymer | | | | Brightness | Workability | | Coating brightness |
| | | | | | | Pin hole | Sag | |
| Examples | Hydrophobic portion SP | Hydrophilic portion SP | Water insoluble polymer SP | Absolute value SP difference [1] | of coating 60°/20° | limit (micron) | limit (micron) | after circulation 60°/20° |
| --- | --- | --- | --- | --- | --- | --- | --- | --- |
| 9 | 10.3 | 11.4 | 11.0 | 0.4 | 98/87 | 56 | 59 | 98/87 |
| 10 | 9.5 | 11.4 | 11.5 | 0.1 | 97/86 | 54 | 63 | 97/86 |
| 11 | 10.3 | 11.4 | 11.0 | 0.4 | 93/84 | 54 | 66 | 93/84 |
| 12 | 9.5 | 11.4 | 11.5 | 0.1 | 92/84 | 52 | 64 | 92/84 |

[1] Between the hydrophilic portion and the water insoluble polymer.

What is claimed is:

1. A water-borne coating composition comprising an aqueous dispersion composed of (1) an aqueous resin selected from the group consisting of an alkyd resin, a polyester resin, an acryl resin, a urethane resin, an aminoplast resin and a maleic resin, (2) an aqueous medium and (3) a graft polymer dispersed therein, wherein said graft polymer has a branch chain with a number average molecular weight of 1,000 to 4,000 and a principal chain, and has a total number average molecular weight of 5,000 to 100,000, one of the branch chain and the principal chain is hydrophobic and has a solubility parameter of 8.0 to 11.5, and the other of the branch chain and the principal chain is hydrophilic and has a solubility parameter of 10.0 to 13.0, and the solubility parameters have an absolute difference therebetween of at least 1, and, when the graft polymer is mixed in an aqueous medium to form an aqueous solution which has a concentration of 10 to 70% by weight and a viscosity of 50 to 10,000 cps, the resultant mixture has an integrating ence between the solubility parameter of said water-insoluble resin (1) and that of the hydrophobic portion of said graft polymer is not more than 2, and said water-insoluble resin (1) has an acid value of not more than 15.

6. The water-borne coating composition according to claim 5 wherein the water-insoluble resin (1) has a number average molecular weight of 3,000 to 10,000.

7. The water-borne coating composition according to claim 5 wherein an amount of the water-insoluble resin (1) is 5 to 100 parts by weight based on 100 parts by weight of the graft polymer.

8. The water-borne coating composition according to claim 5, further comprising an amino resin as a curing agent.

9. A water-borne coating composition comprising an aqueous dispersion composed of a graft polymer and an aqueous medium, and a water-insoluble resin (2) dispersed therein, wherein said graft polymer has a branch chain with a number average molecular weight of 1,000 to 4,000 and a principal chain, and has a total number average molecular weight of 5,000 to 100,000, one of the branch chain and the principal chain is hydrophobic and has a solubility parameter of 8.0 to 11.5, and the other of the branch chain and the principal chain is hydrophilic and has a solubility parameter of 10.0 to 13.0, and the solubility parameters have an absolute difference therebetween of at least 1, and, when the graft polymer is mixed in an aqueous medium to form an aqueous solution which has a concentration of 10 to 70% by weight and a viscosity of 50 to 10,000 cps, the resultant mixture has an integrating sphere turbidity of not more than 50 degree (kaoline), the absolute difference between the solubility parameter of said water-insoluble resin (2) and that of the hydrophilic portion of said graft polymer is not more than 2, and said water-insoluble resin (2) has an acid value of 15 to 100.

10. The water-borne coating composition according to claim 9 wherein an amount of the water-insoluble resin (2) is 2 to 150 parts by weight based on 100 parts by weight of the graft polymer.

11. The water-borne coating composition according to claim 9, further comprising an amino resin as a curing agent.

* * * * *